ated Sept. 24, 1963

3,104,972
ZIRCONIUM-BASE BRAZING ALLOYS
Robert E. Droegkamp, Pittsburgh, Edward R. Slaughter, Brentwood Borough, and Alfred B. Thomas, Whitehall, Pa., assignors to Westinghouse Electric Corporation, East Pittsburgh, Pa., a corporation of Pennsylvania
No Drawing. Filed Oct. 17, 1960, Ser. No. 62,868
13 Claims. (Cl. 75—177)

This invention is directed to novel corrosion-resistant brazing alloys for use in the joining of zirconium-base alloy members, and to brazed structures comprising zirconium-base alloy members and braze metal bonding the members into strong corrosion-resistant unitary assemblies.

In Patent No. 2,772,964 of D. E. Thomas et al., issued December 4, 1956, and assigned to the assignee of the present invention, certain highly corrosion-resistant zirconium-base alloys are disclosed for use in high temperature water and steam. These alloys consist essentially of from 0.1% to 2.5% by weight of tin, a total of at least 0.1%, but not exceeding 2% by weight of at least one metal selected from the group consisting of iron, nickel, and chromium, less than 0.5% by weight of incidental impurities, and the balance being zirconium. These alloys will function satisfactorily even when containing relatively large amounts of such impurities as nitrogen, oxygen, and carbon. Alloys of this type require specially prepared brazing alloys in order to fabricate structures that will not corrode excessively at brazed joints so that there may be produced brazed structures having relatively uniform corrosion resistance throughout. Furthermore, the brazing alloys must produce structures that will exhibit high tensile strengths at the joints.

The requirements for the brazing alloy to be applied to zirconium-base alloy members include further that it have excellent flow properties so that the molten braze material will flow for considerable distances along the brazed joint. Also, the brazing alloy must melt below the melting point of the zirconium-base alloy to which it is applied and yet not dissolve any substantial part of the structural material to which it is applied. An additional requirement is that no flux be employed in producing the brazed joint.

One of the problems encountered in the fabrication of zirconium-base alloy structures is the deleterious effect produced by slow cooling of the structure through the alpha-beta region of the alloy; i.e., through the temperature range from 820° C. to 1000° C. While the bonding procedures presently require slow cooling, of say 50° C. per hour through this temperature range, such rate of cooling has been found to produce a micro-segregation of certain of the alloying elements which gives rise to an accelerated rate of corrosion, especially at elevated temperatures in the presence of water or steam.

The object of the present invention is to provide a brazing alloy containing, in predetermined amounts the metal additive beryllium, at least one element selected from the group consisting of copper, iron, and a copper and cobalt combination, and the balance consisting of a master alloy comprising at least 94% zirconium.

It is another object of the invention to provide a brazed structure embodying as the brazing material a zirconium-base alloy containing in predetermined amounts the elements beryllium, and at least one element selected from the group consisting of copper, iron and a copper and cobalt combination.

A further object of the invention is to provide a process for brazing zirconium-base members into a unitary structure by applying thereto a zirconium-base brazing alloy composed of, in predetermined amounts, the elements beryllium, at least one metal selected from the group consisting of copper, iron, and a copper and cobalt combination, and the balance consisting of a master alloy comprising at least 94% zirconium, the brazing alloy having a melting point of approximately 820° C. and forming a well-bonded joint without the use of a flux.

Other objects of the invention will, in part, be obvious and will, in part, appear hereinafter.

For a better understanding of the nature and objects of this invention, reference should be had to the following detailed description.

In accordance with the present invention, it has been discovered that outstanding brazed structures embodying members of zirconium-base alloys may be prepared by applying thereto a zirconium-base alloy containing from 3% to 8% beryllium, and at least one metal additive selected from the group consisting of copper, iron, and a copper and cobalt combination, copper, when present, amounting to from 5% to 20%, iron, when present, amounting to from 9% to 14%, the copper and cobalt combination, when present, having proportions of from 5% to 15% of copper and from 5% to 9% of cobalt.

These structures may be readily prepared without the use of any flux in the brazing operation.

More particularly, suitable brazing alloys comprise, by weight, from 3% to 8% beryllium, at least one metal additive selected from the group consisting of copper, iron, and a combination of copper and cobalt, copper, when present, amounting to from 5% to 20%, iron, when present, amounting to from 9% to 14%, the copper and cobalt combination, when present, having the proportions of from 5% to 15% copper and from 5% to 9% of cobalt, and the balance consisting of a zirconium-base master alloy comprising up to 2.5% by weight of tin, up to 2% of at least one metal from period 4 of the periodic table selected from the group consisting of iron, nickel, and chromium, carbon not exceeding 0.05%, and the balance being at least 94% zirconium with less than 0.5% by weight of incidental impurities.

In some cases it is more convenient to express the composition of the alloys without separately setting forth the composition of the master alloy employed. For example, by simple calculation, the alloy set forth in the previous paragraph may be alternatively described as follows:

A brazing alloy comprising, by weight, from 3% to 8% beryllium, at least one metal additive selected from the group consisting of copper, iron, and a combination of copper and cobalt, copper, when present, amounting to from 5% to 20%, iron, when present, amounting to from 9% to 14%, the copper and cobalt combination, when present, having the proportions of from 5% to 15% copper and from 5% to 9% of cobalt, and the balance of from 68% to 92% consisting of up to 2.3% tin, up to 1.8% of at least one metal selected from the group consisting of iron, nickel, and chromium, carbon not exceeding 0.05%, and the balance zirconium with less than 0.5% of incidental impurities.

One preferred master alloy consists of from 1.3% to 1.6% by weight fo tin, from 0.07% to 0.12% by weight of chromium, from 0.04% to 0.08% by weight of nickel, from 0.09% to 0.16% by weight of iron, carbon not exceeding 0.05%, less than 0.05% by weight of incidental impurities and the balance being zirconium.

Another preferred master alloy comprises from 0.1% to 0.5% tin, from 0.10% to 0.50% iron, carbon not exceeding 0.05%, less than 0.5% by weight of incidental impurities, and the balance being zirconium.

Zirconium metal itself may be used as the "master alloy."

An especially good brazing alloy is made by employing from 3% to 8% beryllium, from 13% to 20% copper, and the balance a master alloy as described above.

Another good brazing alloy comprises from 3% to 8% beryllium, from 5% to 15% copper, from 5% to 9% cobalt, and the balance a master alloy as described above.

Still another good brazing alloy comprises from 3% to 8% beryllium, from 9% to 14% iron, and the balance a master alloy as described above.

The brazing operations contemplated herein are accomplished by subjecting the assembly to be brazed to a temperature of 870° C. or less while the assembly is enveloped in a non-reactive atmosphere. The term "non-reactive atmosphere" is intended to include both totally inert gases, such as helium or argon, or mixtures thereof, and a high vacuum of the order of one micron and lower absolute pressure. Care should be taken that the gas be treated to remove traces of oxygen, nitrogen, and water vapor.

The brazing alloy may be prepared by melting previously prepared zirconium-base master alloys and then adding the desired amount of alloying constituents thereto. The melting must be carried out in a non-reactive atmosphere, for example, a vacuum or helium. Arc melting procedures have given good results in preparing the alloys, but induction melting may also be used. For brazing purposes, the solidified alloy which is ordinarily in the form of buttons or pins can be readily broken up and crushed to granules or powder for disposal at the surfaces to be brazed.

The zirconium-base alloy members to be brazed into a unitary structure must be cleaned at the surfaces to be joined. While mechanical abrasion or other cleaning procedures may be employed, chemical etching of the surfaces has given good results in practice. A solution comprising a mixture, by volume, of 5% of 48% hydrofluoric acid solution, 35% of concentrated nitric acid, and the balance water, has yielded good results. The surfaces to be brazed are treated with the solution, either by immersion therein or by flowing the solution thereover until all surface films are removed. The cleaned surfaces are coated with a thin layer of dry granulated brazing alloy or of a suspension of the alloy particles in an acrylic resin. The members may be clamped or weighted to maintain their desired positional relationship. The assembly is then placed within a heating chamber, the chamber is then evacuated to less than one micron absolute pressure, and an inert gas such as helium, which is purified by passing it over titanium sponge at a temperature of, for example, 800° C. is admitted to the chamber. A suitable means for heating the members at the joints to be brazed comprises an induction coil encircling the member. However, radiant heating means may also be employed to heat the area at the joint to the desired temperature. The brazing alloys of this invention have melting points of approximately 820° C. A temperature in the range from 850° C. to 870° C. will cause the applied brazing alloy to melt and flow freely along the space between the superimposed members. The temperature may then be reduced and the molten brazing alloy will solidify, thereby forming an excellent brazed joint. In some cases, spacers of molybdenum or other relatively non-reactive metals may be employed in order to secure precise dimensions in the resulting brazed structure.

The following examples are illustrative of the practice of the invention.

Example I

Pellets of a zirconium base master alloy comprising approximately 1.5% tin, 0.1% chromium, 0.07% nickel, 0.12% iron, carbon not exceeding 0.05%, less than 0.4% incidental impurities, and the balance zirconium were admixed with 4% beryllium and 15% copper based on the total weight of the alloy constituents. This mixture was melted using a non-consumable electrode in a water-cooled copper crucible employing a helium atmosphere. The resulting ingot was then mechanically pulverized into coarse particles. Flat strips, two inches long, one-half inch wide, and a quarter inch thick, were prepared from a zirconium-base alloy of a composition similar to that employed for the master alloy. These strips were cleaned by immersing them in an etchant comprising 5% by volume of 48% hydrofluoric acid solution, 35% by volume of concentrated nitric acid and the balance water. The etchant was applied for a period of itme sufficient to remove several mils of metal from the surfaces. Two of the cleaned strips were clamped together to produce a single lap joint approximately three-quarters of an inch in length, and particles of the brazing alloy were positoined along the joint. The members thus assembled were disposed within an induction coil located inside a hermetically sealed chamber. The chamber was evacuated to an absolute pressure of approximately 0.1 micron. Thereafter, purified helium was admitted to the chamber until approximately one atmosphere pressure was obtained in the chamber. The helium had been previously purified by passing it over heated titanium sponge. Thereafter, the induction coil was energized whereby the lap joint was heated to a temperature of approximately 870° C. for a period of time of approximately 1 minute. When the flow of the brazing alloy was evident at the joint the induction coil was deenergized, and the assembly was permitted to cool to approximately room temperature before it was removed from the chamber.

The resulting brazed structures were tested for corrosion in high temperature water at 680° F. After 200 days in hot water, the brazed structures were examined. In no case was there evident any corrosion at the joint different from the corrosion of the brazed members themselves. Microscopic examination of the joint and the adjacent metal showed no preferential attack at that point. Other samples were subjected to shear tests. These tests gave tensile strengths of approximately 45,000 p.s.i. Samples which were annealed for one week at 750° C. showed improved shear strength of 49,000 p.s.i.

Example II

Following the procedure of Exampe I a brazing alloy was prepared containing 4% beryllium, 10% copper, 5% cobalt, and the balance the same master alloy used in Example II.

When members brazed with this alloy were tested in shear, values approximating 17,000 p.s.i. were obtained. When these samples were annealed for one week at 750° C. an improved value of 19,000 p.s.i. was obtained.

Example III

The procedures of Examples I and II were followed and an alloy was prepared including 4% beryllium, 13% iron, and the balance the master alloy described in Example I.

Lap joints using this brazing alloy were prepared and tested. Tests values of 30,000 p.s.i. were obtained in the as-brazed condition, but after an annealing treatment lasting one week at a temperature of 750° C., values approximating 46,000 p.s.i. were obtained.

The brazing alloys of Examples II and III exhibited corrosion resistance equivalent to that obtained with a brazing alloy of Example I.

There have thus been described brazing alloys whose melting temperatures are sufficiently low that the necessity for a rapid cooling of the members through the alpha-beta region of the zirconium-base metal alloy is eliminated.

It will be understood that the above description is illustrative and not limiting.

We claim as our invention:

1. A zirconium-base brazing alloy suitable for joining members formed from zirconium and zirconium-base alloys comprising, by weight, from 3% to 8% beryllium, at least one metal additive selected from the group consisting of copper, iron, and a copper and cobalt combination; copper, when present, amounting to from 5% to 20%, iron, when present, amounting to from 9% to 14%, the copper and cobalt combination, when present, having the proportions of from 5% to 15% copper and from 5% to 9% cobalt; and the balance of from 68% to 92% consisting of up to 2.3% by weight of tin, up to 1.8% by weight of at least one metal selected from the group consisting of iron, nickel, and chromium, carbon not exceeding .05%, and the balance zirconium with less than 0.5% by weight of incidental impurities.

2. A zirconium-base brazing alloy suitable for joining members formed from zirconium and zirconium-base alloys comprising, by weight, from 3% to 8% beryllium, from 13% to 20% copper, and the balance of at least 72% consisting of up to 2.1% by weight of tin, up to 1.7% by weight of at least one metal selected from the group consisting of iron, nickel, and chromium, carbon not exceeding 0.04%, and the balance being zirconium with less than 0.4% by weight of incidental impurities.

3. A zirconium-base brazing alloy suitable for joining members formed from zirconium and zirconium-base alloys comprising, by weight, from 3% to 8% beryllium, from 5% to 9% cobalt, from 5% to 15% copper, and the balance of at least 68% consisting of up to 2.2% by weight of tin, up to 1.7% by weight of at least one metal selected from the group consisting of iron, nickel, and chromium, carbon not exceeding 0.04% and the balance zirconium with less than 0.5% by weight of incidental impurities.

4. A zirconium-base brazing alloy suitable for joining members formed from zirconium and zirconium-base alloys comprising, by weight, from 3% to 8% beryllium, from 9% to 14% iron, and the balance of at least 78% consisting of up to 2.2% by weight of tin, up to 1.8% by weight of at least one metal selected from the group consisting of iron, nickel, and chromium, carbon not exceeding 0.04%, and the balance zirconium with less than 0.4% by weight of incidental impurities.

5. A zirconium-base brazing alloy suitable for joining members formed from zirconium and zirconium-base alloys comprising, by weight, from 3% to 8% beryllium, from 13% to 20% copper, and the balance zirconium with small amounts of incidental impurities.

6. A zirconium-base brazing alloy suitable for joining members formed from zirconium and zirconium-base alloys comprising, by weight, from 3% to 8% beryllium, from 5% to 9% cobalt, from 5% to 15% copper, and the balance zirconium with small amounts of incidental impurities.

7. A zirconium-base brazing alloy suitable for joining members formed from zirconium and zirconium-base alloys comprising, by weight, from 3% to 8% beryllium, from 9% to 14% iron, and the balance zirconium with small amounts of incidental impurities.

8. A zirconium-base brazing alloy suitable for joining members formed from zirconium and zirconium-base alloys comprising, by weight, from 3% to 8% beryllium from 13% to 20% copper, and the balance consisting of from 0.9% to 1.3% by weight of tin, from 0.05% to 0.10% by weight of chromium, from 0.03% to 0.07% by weight of nickel, from 0.06% to 0.13% by weight of iron, carbon not exceeding 0.04%, less than 0.4% by weight of incidental impurities, and the balance being zirconium.

9. A zirconium-base brazing alloy suitable for joining members formed from zirconium and zirconium-base alloys comprising, by weight, from 3% to 8% beryllium, from 5% to 9% cobalt, from 5% to 15% copper, and the balance consisting of from 0.9% to 1.4% by weight of tin, from 0.06% to 0.10% by weight of chromium, from 0.03% to 0.07% by weight of nickel, from 0.07% to 0.14% by weight of iron, carbon not exceeding 0.03%, less than 0.3% by weight of incidental impurities, and the balance being zirconium.

10. A zirconium-base brazing alloy suitable for joining members formed from zirconium and zirconium-base alloys comprising, by weight, from 3% to 8% beryllium, from 9% to 14% iron, and the balance consisting of from 1.0% to 1.4% by weight of tin, from 0.05% to 0.11% by weight of chromium, from 0.03% to 0.06% by weight of nickel, from 0.07% to 0.12% by weight of iron, carbon not exceeding 0.04%, less than 0.4% by weight of incidental impurities, and the balance being zirconium.

11. A zirconium-base brazing alloy suitable for joining members formed from zirconium and zirconium-base alloys comprising, by weight, from 3% to 8% beryllium, from 13% to 20% copper, and the balance consisting of from 0.07% to 0.40% tin, from 0.07% to 0.40% iron, and the balance zirconium except for incidental impurities.

12. A zirconium-base brazing alloy suitable for joining members formed from zirconium and zirconium-base alloys comprising, by weight, from 3% to 8% beryllium, from 5% to 9% cobalt, from 5% to 15% copper, and the balance consisting of from 0.07% to 0.40% tin, from 0.07% to 0.40% iron, and the balance zirconium except for incidental impurities.

13. A zirconium-base brazing alloy suitable for joining members formed from zirconium and zirconium-base alloys comprising, by weight, from 3% to 8% beryllium, from 9% to 14% iron, and the balance consisting of from 0.08% to 0.40% tin, from 0.08% to 0.40% iron, and the balance zirconium except for incidental impurities.

References Cited in the file of this patent

FOREIGN PATENTS 82,472 Sweden _____ Jan. 29, 1935